United States Patent
Ishihara et al.

(12) United States Patent (10) Patent No.: US 6,941,385 B2
(45) Date of Patent: Sep. 6, 2005

(54) SERVER TRANSFERRING ONLY IMAGE DISPLAY DATA FOR A PART OF A DISPLAY IMAGE WHICH IS TO BE UPDATED FOR ASSOCIATED TERMINALS

(75) Inventors: Tomoyuki Ishihara, Nara (JP); Akihiko Inoue, Kyoto (JP); Yuji Sato, Tenri (JP); Toshihisa Nakano, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 814 days.

(21) Appl. No.: 09/862,903

(22) Filed: May 22, 2001

(65) Prior Publication Data

US 2001/0056464 A1 Dec. 27, 2001

(30) Foreign Application Priority Data

May 22, 2000 (JP) .................................... 2000-150592
Mar. 22, 2001 (JP) .................................... 2001-083907

(51) Int. Cl.[7] .............................................. G06F 15/16
(52) U.S. Cl. ...................... 709/250; 709/252; 709/203
(58) Field of Search ................................. 709/252, 250, 709/208, 203, 204, 200; 707/10; 700/241

(56) References Cited

U.S. PATENT DOCUMENTS 6,052,629 A * 4/2000 Leatherman et al. ........ 700/241
6,266,666 B1 * 7/2001 Ireland et al. ................ 707/10
6,356,905 B1 * 3/2002 Gershman et al. ............ 707/10
6,609,146 B1 * 8/2003 Slotznick ..................... 709/200
6,760,748 B1 * 7/2004 Hakim ......................... 709/204
2002/0013808 A1 * 1/2002 Case et al. ................... 709/203

FOREIGN PATENT DOCUMENTS

JP          07-287680        10/1995

* cited by examiner

Primary Examiner—Le Hien Luu
(74) Attorney, Agent, or Firm—David G. Conlin; David A. Tucker; Edwards & Angell, LLP (57) ABSTRACT

A server system of the present invention includes a server apparatus and one or more terminal apparatuses electrically connected to the server apparatus through a transmission line, in which each of the one or more terminal apparatuses include one or more input devices, the server apparatus implements an operating system and an application program, the server apparatus includes input information recognition means for recognizing an input information signal which is output from each of the one or more input devices and input to the server apparatus, and the server apparatus executes the operating system and the application program based on the input information signal.

11 Claims, 4 Drawing Sheets

SERVER TRANSFERRING ONLY IMAGE DISPLAY DATA FOR A PART OF A DISPLAY IMAGE WHICH IS TO BE UPDATED FOR ASSOCIATED TERMINALS

BACKGROUND OF THE INVENTION

1. Field of the Invention

The present invention relates to a server system including a server apparatus and at least one terminal apparatus electrically connected thereto through transmission lines.

2. Description of the Related Art

A server apparatus included in a conventional server system stores data and application programs shared by numerous terminal apparatus users. The server apparatus is connected to terminal apparatuses through a network such as a LAN. Each terminal apparatus includes: an image display device such as a CRT, a liquid crystal panel or the like; various input devices such as a keyboard and the like; and various functional devices such as a CPU (central processing unit), a system memory, a video controller, a hard disk, etc. That is, each terminal apparatus forms an independent computer system which can operate an operating system for managing the entire terminal apparatus.

Each terminal apparatus of the conventional server system is expensive since the terminal apparatus forms an independent computer system. Accordingly, a large investment is necessary for increasing the number of terminal apparatuses.

In recent years, functions of functional devices such as a CPU, a video controller and the like have been rapidly improving, and accordingly, required resources and the amount of data to be processed for each application program have increased. Thus, it is ideal to enhance the performance of an entire server system. However, it is a significant economic burden to upgrade or newly purchase all of the numerous terminal apparatuses. Thus, in many server systems, there are many old type terminal apparatuses with inferior performance that have not been upgraded or substituted.

A large amount of electric power is consumed in the case when using a computer system having numerous functional devices as a terminal apparatus.

Furthermore, when an application program is commonly used by a plurality of terminal apparatuses (for example, when a plurality of users take part in an interactive game over a network or when a television conference is held over a network), the application program needs to be executed on each terminal apparatus. In such a case, resources are wasted.

Further still, since it is difficult to share information in real time among a plurality of computers connected through a LAN or the like, performance of an application program is greatly restricted.

SUMMARY OF THE INVENTION

According to one aspect of the present invention, there is provided a server system including a server apparatus and one or more terminal apparatuses electrically connected to the server apparatus through a transmission line, in which the one or more terminal apparatuses each include one or more input devices, the server apparatus implements an operating system and an application program, the server apparatus includes input information recognition means for recognizing an input information signal which is output from each of the one or more input devices and input to the server apparatus, and the server apparatus executes the operating system and the application program based on the input information signal.

According to one embodiment of the invention, each of the one or more terminal apparatuses is connected to at least one of one or more image display devices and one or more output devices, and the server apparatus includes at least one of image display data generation means, for generating image display data which is input to the one or more image display devices based on the input information signal, and output control data generation means, for generating an output control signal which is input to the one or more output devices based on the input information signal.

According to another embodiment of the invention, the one or more terminal apparatuses and the server apparatus each include communication means which uses a same communication method to realize mutual communication between the at least one terminal apparatus and the server apparatus.

According to still another embodiment of the invention, the one or more terminal apparatuses are arranged in a tree configuration such that the terminal apparatuses are electrically connected to each other and the one or more terminal apparatuses function as a hub for the input device and the output device included in the at least one terminal apparatus.

According to still another embodiment of the invention, the server apparatus recognizes the terminal apparatus in connection with all of the one or more input devices and/or the one or more output devices attached to the terminal apparatus, and the input information signal is reflected in the application program executed on the server apparatus.

According to still another embodiment of the invention, the one or more terminal apparatuses each have a first authentication number, the input device and the output device each have a second authentication number, and the server apparatus recognizes the first authentication number and each of the second authentication numbers for all of the input devices and/or the output devices attached to the terminal apparatus in connection with each other and executes the application program in association with the first and second authentication numbers.

According to another aspect of the present invention, server apparatus implements an operating system and an application program, in which the server apparatus includes input information recognition means for recognizing an input information signal which is input to the server apparatus, and the server apparatus executes the operating system and the application program based on the input information signal.

According to one embodiment of the invention, the server apparatus is connected to one or more terminal apparatuses, each of which is connected to at least one of one or more image display devices and one or more output devices, and the server apparatus includes at least one of image display data generation means, for generating image display data which is input to the one or more image display devices based on the input information signal, and output control data generation means, for generating an output control signal which is input to the one or more output devices based on the input information signal.

According to another embodiment of the invention, the one or more terminal apparatuses and the server apparatus each include communication means which uses a same communication method to realize mutual communication therebetween.

According to still another embodiment of the invention, the server apparatus recognizes the terminal apparatus in connection with all of the one or more input devices and/or the one or more output devices attached to the terminal apparatus, and the input information signal is reflected in the application program executed on the server apparatus.

According to still another embodiment of the invention, the one or more terminal apparatuses each have a first authentication number, the input device and the output device each have a second authentication number, and the server apparatus recognizes the first authentication number of each terminal apparatus and the second authentication numbers for all of the input devices and/or the output devices attached to the terminal apparatus in connection with each other and executes the application program in association with the first and second authentication numbers.

Thus, the invention described herein makes possible the advantage of providing a server system which is capable of executing, on a server apparatus, an operating system and application programs associated with tasks performed by terminal apparatuses, thereby executing the application programs with high performance in an inexpensive and power saving manner and without wasting resources.

This and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described in detail with reference to the drawings.

Figure 1:
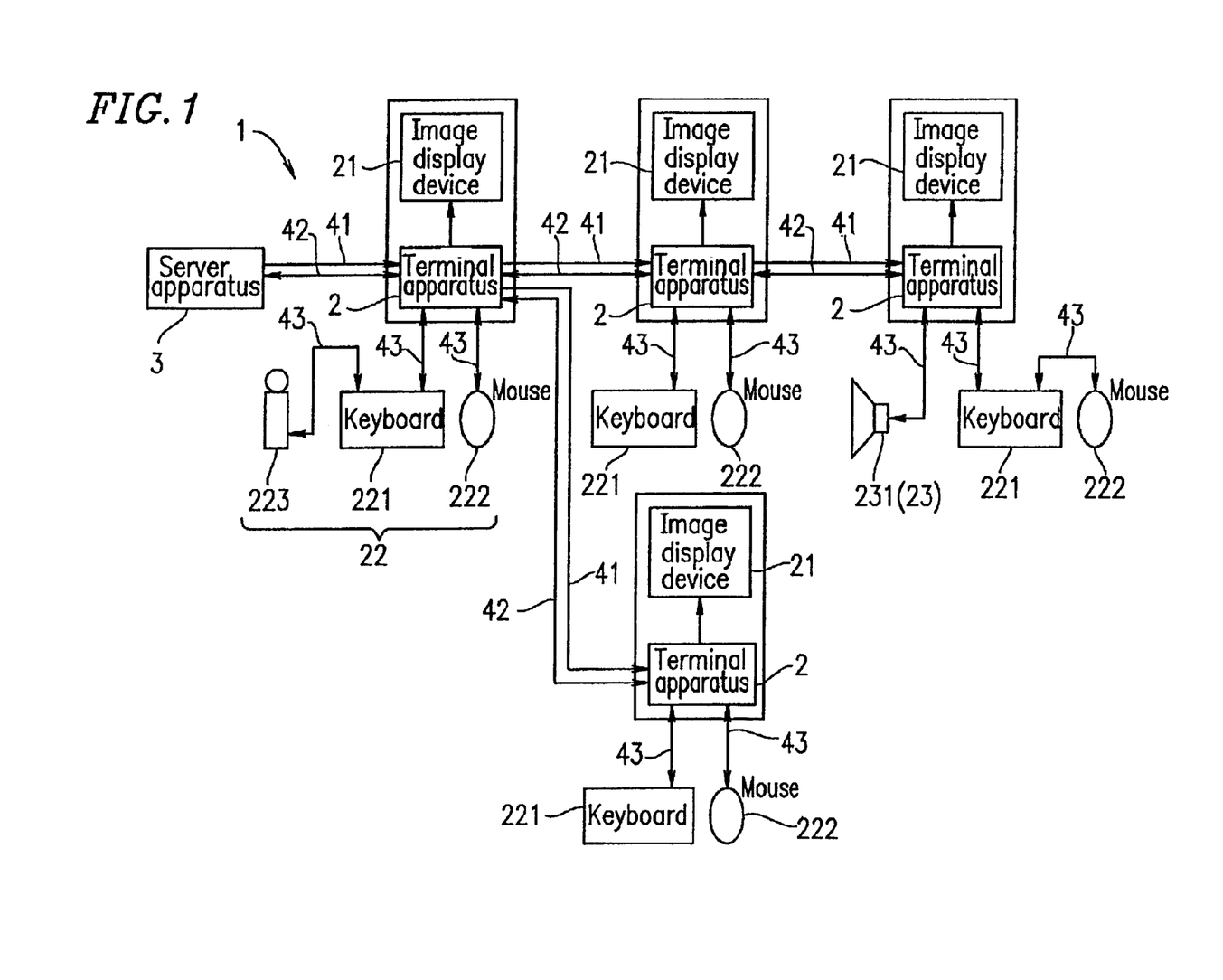
FIG. 1 is a block diagram illustrating a structure of a server system according to an embodiment of the present invention.

FIG. 1 is a block diagram illustrating a structure of a server system according to an embodiment of the present invention. A server system 1 includes: a plurality of terminal apparatuses 2, each of which is used by one user; a server apparatus 3 which executes an operating system and application programs associated with tasks performed by each terminal apparatus 2; one-way parallel terminal apparatus communication cables 41 and two-way serial terminal apparatus communication cables 42, which are transmission lines for providing electrical connections between the terminal apparatuses 2 and the server apparatus 3. In the server system 1, different tasks can be performed by the respective terminal apparatuses 2.

In the following description, the server apparatus 3 is assumed to be at an upstream side with respect to the terminal apparatuses 2. An end of an uppermost terminal apparatus 2 in the stream which receives data for displaying images (hereinafter, referred to as "image display data") is connected to the server apparatus 3 through a one-way parallel terminal apparatus communication cable 41 and a two-way serial terminal apparatus communication cable 42.

An end of the uppermost terminal apparatus 2 which outputs image display data is connected to ends of two down stream terminal apparatuses 2 which receive image display data through the one-way parallel terminal apparatus communication cables 41 and the two-way serial terminal apparatus communication cables 42. One of the two downstream terminal apparatuses 2 has an end which is connected to an end of another terminal apparatus 2 at the downmost position in the stream which receives image display data through the one-way parallel terminal apparatus communication cable 41 and the two-way serial terminal apparatus communication cable 42. In this case, the uppermost terminal apparatus 2 bridges the server apparatus 3 and the two downstream terminal apparatuses 2 for establishing a one-way parallel communication and two-way serial communication therebetween. In the similar manner, the uppermost terminal apparatus 2 and the two downstream terminal apparatuses 2 bridge the server apparatus 3 and the downmost terminal apparatus 2 for establishing a one-way parallel communication and two-way serial communication therebetween.

Two input devices 22 and/or output devices 23 can be connected to each terminal apparatus 2 through two-way serial communication cables 43 for peripheral devices. Each terminal apparatus 2 is fixedly connected to an image display device 21 and has functions of outputting a control signal and transferring image display data to the image display device 21. The input device 22 may include a keyboard 221, a mouse 222 and/or a microphone 223 which are connected to the terminal apparatus 2. The output device 23 may include a sound generator 231, such as a speaker or the like, which is connected to the terminal apparatus 2. These input devices 22 and output devices 23 have serial two-way interfaces (not shown), all of which are produced according to the same standard, so that two-way communications can be established between the terminal apparatus 2 and the input and output devices 22 and 23 having the serial two-way interfaces. The keyboard 221 has an interface port which is connectable to the terminal apparatus 2 and an interface port which is connectable to an input device 22 or output device 23. For example, the keyboard 221 connected to the downmost terminal apparatus 2 is connected to a mouse 222 through an interface port.

The server apparatus 3 is, for example, a personal computer and is capable of separately executing a plurality of application programs in a parallel or serial time-sharing manner. The server apparatus 3 is connected to the terminal apparatuses 2 through the one-way parallel terminal apparatus communication cables 41 and the two-way serial terminal apparatus communication cables 42, so that the server apparatus 3 can transfer image display data to a target terminal apparatus 2, output a control signal to an output device 23 (e.g., a sound generator 231) of the target terminal apparatus 2, and read an input information signal from an input device 22 of the target terminal apparatus 2. In order to perform two-way communication, each of the server apparatus 3 and the terminal apparatus 2 has communication means which will be described later. The input information signals are transferred from the terminal apparatuses 2 to the server apparatus 3 while various control signals, such as image display data or output control data are transferred from the server apparatus 3 to the terminal apparatuses 2.

Figure 2:
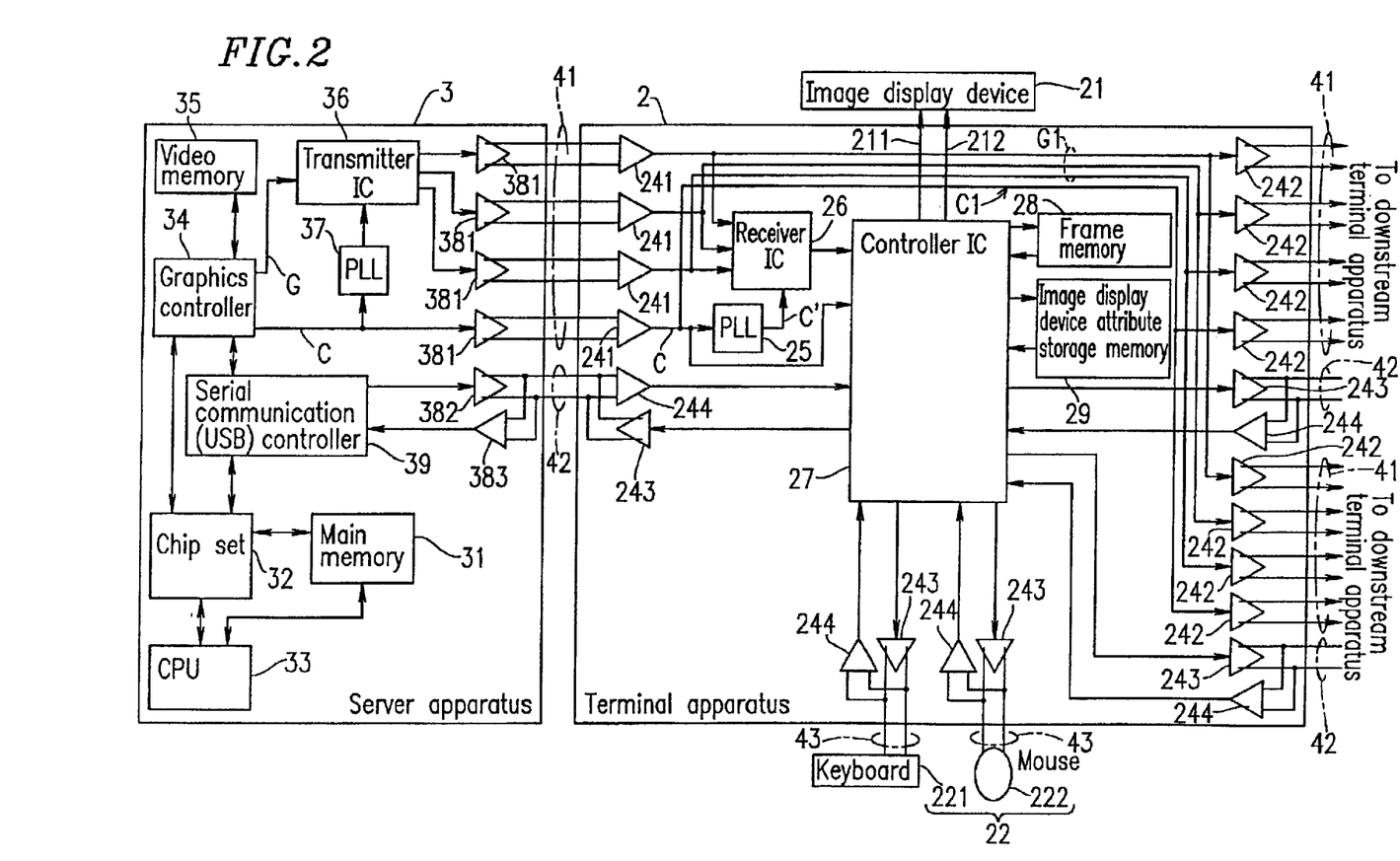
FIG. 2 is a block diagram illustrating detailed internal structures of a server apparatus and a terminal apparatus in the server system of FIG. 1.

FIG. 2 is a block diagram illustrating in detail internal structures of the server apparatus 3 and the terminal apparatus 2 included in the server system 1 of FIG. 1. The server apparatus 3 includes a main memory 31, a chip set 32, and a CPU 33 which is a central processing unit for controlling the chip set 32. Since the server apparatus 3 includes these components, the server apparatus 3 may separately execute a plurality of application programs in a parallel and/or serial time-sharing manner.

The main memory 31 stores a plurality of application programs related to each set of input information and data related thereto, together with an operating system. The related data includes authentication numbers allocated to a set including a terminal apparatus 2, and input and output devices 22 and 23 connected thereto. Specifically, the authentication numbers are each allocated to a respective one of the terminal apparatus 2, the input device 22, and the output device 23 such that the terminal apparatus 2, the input device 22, and the output device 23 of the same set can be recognized by the server apparatus 3 in connection with one another.

The chip set 32 is controlled by the CPU 33. The chip set 32 recognizes an input information signal from the input device 22 and executes an application program based on the input information to activate a graphics function or generate an output control signal to be output to the output device 23. The main memory 31, the chip set 32, and the CPU 33 form input information recognition means for recognizing an input information signal from the input device 22 and/or output control data generation means for generating an output control signal to the output device 23.

The server apparatus 3 includes a graphics controller 34 and a video memory 35 for carrying out a graphics function. The graphics controller 34 and the video memory 35, in conjunction with the main memory 31, the chip set 32, and the CPU 33 form image display data generation means for outputting image display data to the image display device 21.

Moreover, the server apparatus 3 employs a transmission method called TMDS (and an image display data transmission means based on this method) for a function of transmitting the image display data. The image display data transmission means include a transmitter IC 36, a PLL 37, and a differential output driver 381. The PLL 37 multiplies a frequency of a clock signal C for data transmission, which is output from the graphics controller 34, to the 10th power such that the clock signal C is in synchronization with a high-speed clock. The transmitter IC 36 compresses a graphics controller output signal G which is output from the graphics controller 34. For example, 24 bits of original image display data and 3 bits of a control signal are compressed into 3 bits in total. Moreover, the compressed image display data and the clock signal C are converted into differential signals by the differential output drivers 381 and are transferred to a target terminal apparatus 2 through the one-way parallel terminal apparatus communication cable 41 which is a cable for transferring an image display signal.

Figure 4:
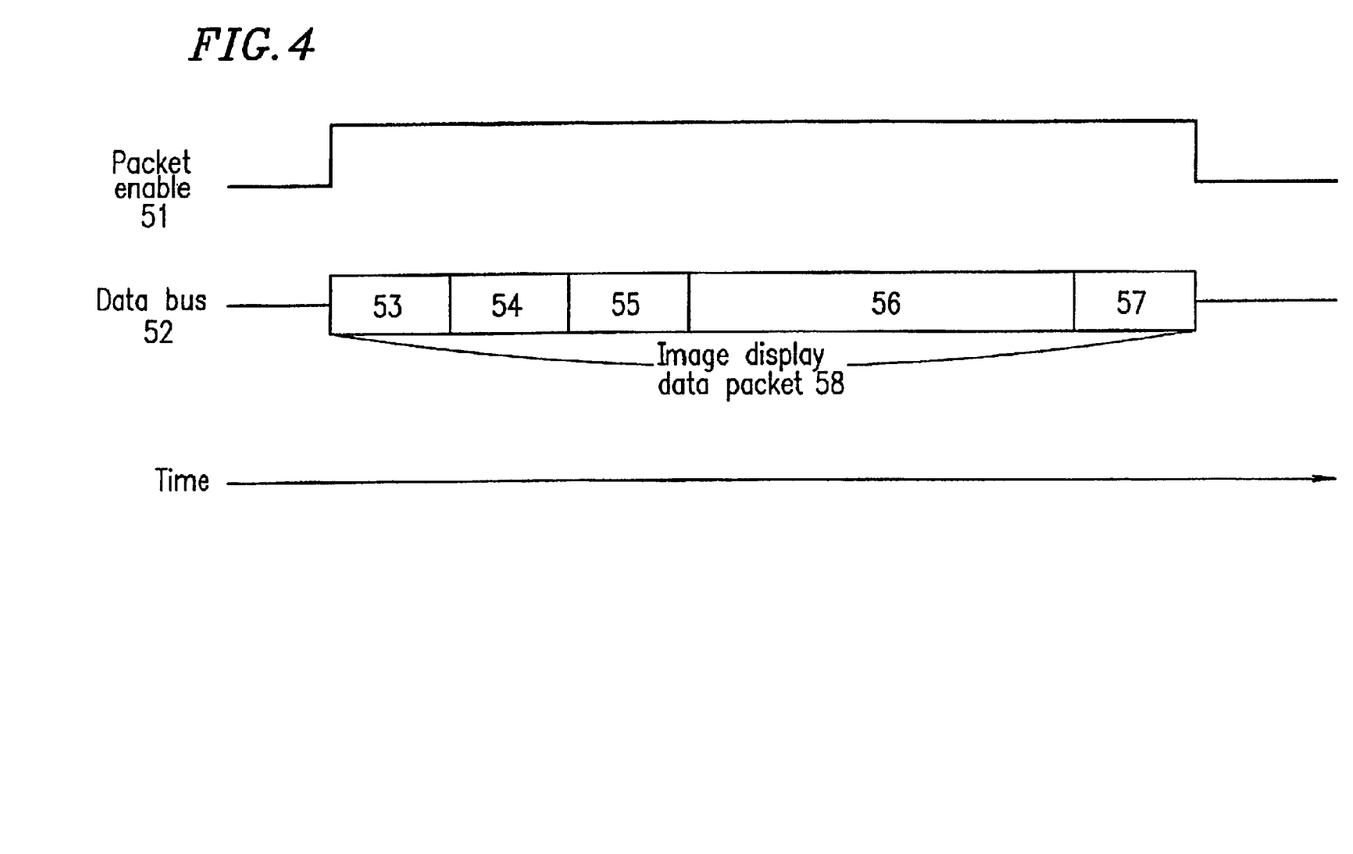
FIG. 4 is a diagram illustrating a structure of image display data.

FIG. 4 is a diagram illustrating a structure of image display data. The image display data is a packet containing a code (authentication number) 53 for specifying a target terminal apparatus 2 (or image display device 21), a code 54 for indicating a position in an upper left corner of an image to be replaced on a display screen, a code 55 for indicating a position in a lower right corner of an image to be replaced, a main part of image data 56, a CRC (cyclic redundancy check) code 57 for error correction, etc. The image display data is transferred in the form of a packet. Output device control data includes a code (authentication number) for specifying a target terminal apparatus 2 and an output device 23 attached thereto, a main part of output control data, etc. The input information signal includes a code (authentication number) for specifying the target terminal apparatus 2 and an input device 22 attached thereto, a main part of input information data, etc.

When this image transfer method is used, the server apparatus 3 transfers only data for a part of an image which is to be updated only when the display image is replaced with a new one. Accordingly, there is no need to continuously refresh the display screen of each image display device 21. Compared with a common image display data transfer method which continuously requires the display screen to be refreshed by the server apparatus 3, the above-described image transfer method is suitable for displaying images while managing a plurality of image display devices 21 since an image display data signal line is not susceptible to data congestion.

Referring back to FIG. 2, the server apparatus 3 is provided with a serial communication controller 39. The serial communication controller 39 performs a two-way serial transfer called a USB (Universal Serial Bus) and has functions of outputting and inputting a serial signal. The output signal is converted into a differential signal by a differential output driver 382, and then, transferred to the terminal apparatus 2 through a two-way serial terminal apparatus communication cable 42 which is a transfer cable. Further, an input information signal is input from the terminal apparatus 2 to a differential input buffer 383 through the same two-way serial terminal apparatus communication cable 42. The differential input buffer 383 converts the input signal into a logic input level signal, and thereafter outputs the converted signal to the serial communication controller 39. The serial communication controller 39 outputs the signal received from the differential input buffer 383 to the chip set 32 and the graphics controller 34.

The above-described image display data transfer means, the serial communication controller 39, the differential output driver 382, and the differential input buffer 383 form a two-way serial communication means in the server apparatus 3.

Next, details of a structure of the terminal apparatus 2 will be described. The terminal apparatus 2 includes a plurality of differential input buffers 241. Each of the differential input buffers 241 receives image display data transferred according to the TMDS method from the server apparatus 3 and converts the image display data into a logic signal. Each differential input buffer 241 is connected to a pair of differential output drivers 242 for transferring data to two downstream terminal apparatuses 2. Each pair of differential output drivers 242 inversely converts image display data G1 and a transfer clock signal C1, which have been received at each differential input buffer 241 from the server apparatus 3, into differential signals and outputs the differential signals to the two downstream terminal apparatuses 2.

The terminal apparatus 2 also includes a PLL 25 and a receiver IC 26. The PLL 25 multiplies the frequency of the transfer clock signal C from the differential input buffer 241. The receiver IC 26 is operated by a clock signal C' multiplied by the PLL 25. The receiver IC 26 functions as data expanding means for inversely converting the compressed image display data from each differential input buffer 241 into a data signal formed by 24 bits of original image display data and 3 bits of a control signal.

Moreover, the terminal apparatus 2 is provided with a controller IC 27 to which the expanded image display data is input and a frame memory 28 connected thereto. An image display device 21 having a display screen such as a CRT, a liquid crystal panel or the like is electrically connected to the terminal apparatus 2. Between the controller IC 27 and the image display device 21, an image display data signal line 211 and an image display device control signal bus 212 which transfers a data transfer clock or a signal such as a vertical scanning signal and a horizontal scanning signal, or a liquid crystal driver control signal, are provided. Accordingly, contents of the frame memory 28 are transferred to the image display device 21 as image data by the controller IC 27 of the terminal apparatus 2 and is displayed on a display screen of the image display device 21.

When the controller IC 27 determines that image display data transferred from the server apparatus 3 indicates a terminal apparatus 2 which includes the controller IC 27 (i.e., when authentication numbers match), a part of or all of the image data in the frame memory 28 is converted into the image display data. The controller IC 27 frequently refreshes the display screen such that the contents of the frame memory 28 are displayed on the image display device 21.

The controller IC 27 also includes a hub function for USB communication. The controller IC 27 has a function of establishing a USB serial communication with the server apparatus 3 and a function of mediating a USB serial communication between the server apparatus 3 and the input device 22 or the output device 23 of the terminal apparatus 2, or between the server apparatus 3 and other terminal apparatuses 2 which are positioned downstream with respect to that terminal apparatus 2, based on authentication information.

Moreover, the terminal apparatus 2 includes five pairs of a differential output driver 243 and a differential input buffer 244 for USB communication: one pair is provided at the upstream side of terminal apparatus 2, two pairs are provided at the downstream side of terminal apparatus 2, and two pairs are provided for the input device 22. The logic level signals which are input to the differential output drivers 243 are output from the controller IC 27. All of the logic signals which are output from the differential input buffer 244 are input to the controller IC 27.

Furthermore, each one of the input devices 22 and the output devices 23 has a USB communication function. Accordingly, the input device 22 and the output device 23 can establish USB communications with the server apparatus 3 using a USB communication function for an input/output device of the terminal apparatus 2. Some of the keyboards 221 have a function of establishing the USB communication with downstream devices connected thereto. Such a keyboard 221 has a hub function for allowing the keyboard 221 to act as a central hub of the USB communication.

The controller IC 27, the differential input buffers 241 and 244, and the differential output drivers 242 and 243 described above form two-way serial communication means in the terminal apparatus 2.

The terminal apparatus 2 further includes an image display device attribute storage memory 29 for storing parameters which specify attributes of the image display device 21. The terminal apparatus 2 uses the USB communication function to allow the image display device attribute information to be read from or written in storage means of the server apparatus 3, such as the main memory 31.

At first, the server apparatus 3 executes an operating system or an application program, issues authentication numbers to a terminal apparatus 2, an input device 22, and an output device 23 using the USB communication function, and obtains attribute information for each one of the terminal apparatuses 2, the input devices 22, and the output devices 23. In this case, each terminal apparatus 2 operates as a hub device for the USB communication. The server apparatus 3 issues the authentication numbers for the input devices 22 and output devices 23 such that the authentication numbers issued to the input device 22 and the output device 23 can be recognized by the server apparatus 3 in connection with the authentication number issued to the terminal apparatus 2 to which those input device 22 and output device 23 are attached. The server apparatus 3 allows the authentication numbers of the input device 22 and output device 23 to be stored, together with the attribute information, in a storage section (not shown) of the controller IC 27 of the terminal apparatus 2 to which the input device 22 and the output device 23 are attached.

The respective attribute information of the terminal apparatuses 2, the input devices 22, and the output devices 23 which have been obtained by the server apparatus 3 indicate a function and the performance of the image display device 21, the input devices 22 such as the keyboards 221, the mice 222, or the like, and the output devices 23. In particular, when the attribute information of a terminal apparatus 2 which has been obtained by the server apparatus 3 indicates that the terminal apparatus 2 is a terminal apparatus display device to which an image display device 21 is attached, the attribute information of the image display device 21 are read from the image display device attribute storage memory 29 by the server apparatus 3.

The allocation of the respective authentication numbers for terminal apparatuses 2, to each of which an image display device 21 is connected, and report of transfer error status during the transfer of image display data from each terminal apparatus 2 to the server apparatus 3 are automatically performed using the USB communication function.

Figure 3:
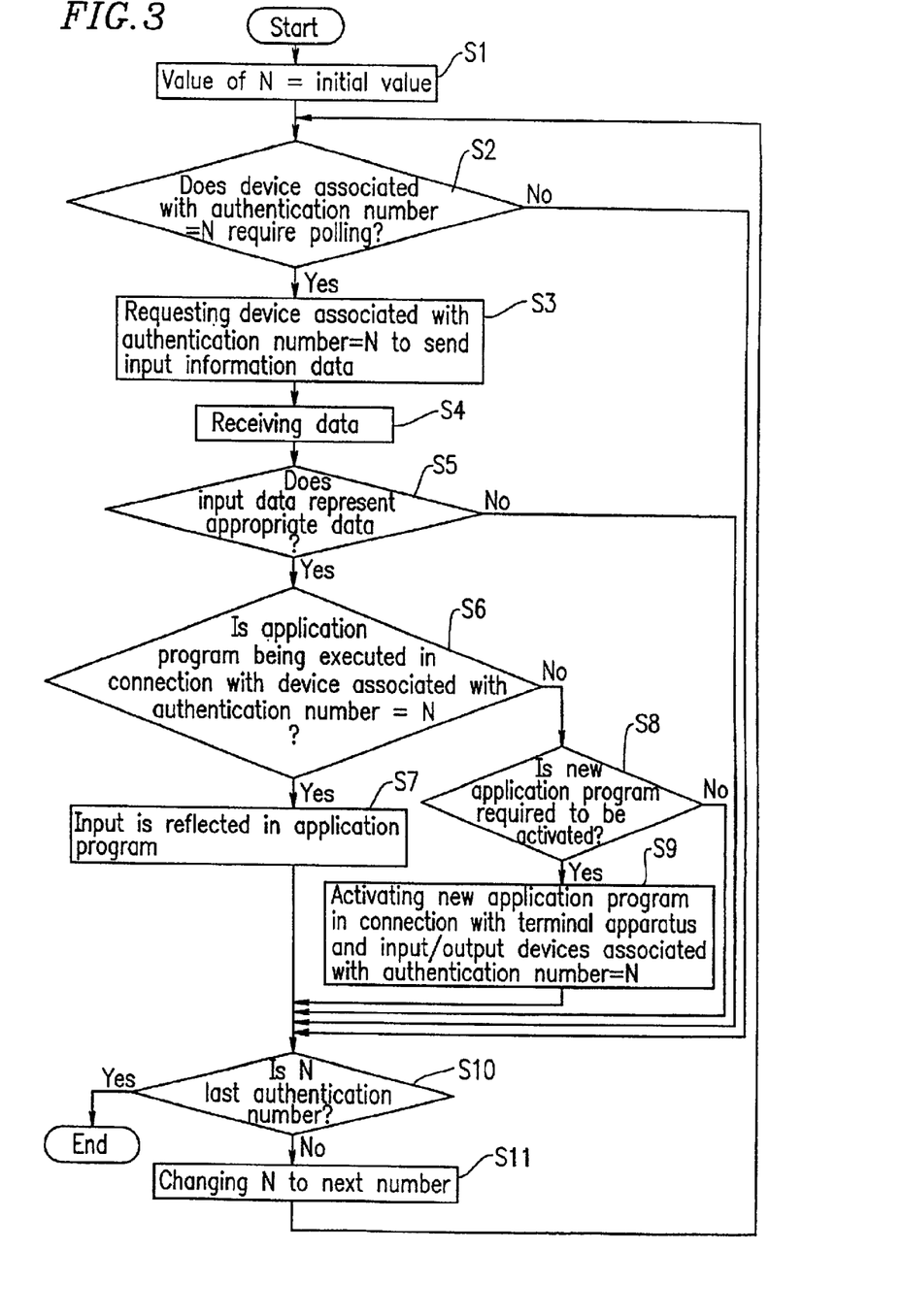
FIG. 3 is a flowchart illustrating an operation procedure of the server system shown in FIG. 1 when an input operation at a terminal apparatus 2 is reflected in a system application program.

FIG. 3 is a flowchart illustrating an operation procedure of the server system shown in FIG. 1 when an input operation at a terminal apparatus 2 is reflected in a system application program. The operation procedure is now described in detail below with reference to FIG. 3.

In the operation procedure, a new application program may be activated by an input operation with the keyboard 221 or mouse 222. It is natural that the input operation is required to be reflected in an application program which is being executed. A method of receiving input information data from the input devices 22, such as the keyboard 221 included in the server system 1, may employ a polling technique in which the server apparatus 3 periodically obtains the input information data from each input device 22.

At step S1, a value of N which represents an authentication number of a terminal apparatus 2 is set to an initial value. Specifically, a region for storing a value representing one of the authentication numbers allocated to the terminal apparatuses 2 is secured within the main memory 31 in the server apparatus 3, and an initial value for the authentication number is stored in the secured memory region. A value in the secured memory region is represented as N.

At step S2, the server apparatus 3 determines whether or not a device associated with the authentication number N is a device which requires polling, such as the keyboard 221 or mouse 222, by utilizing the arrangement where the server apparatus 3 recognizes an authentication number of each terminal apparatus 2 in association with attributes of an image display device 21, an input device 22, and an output device 23 which are attached to that terminal apparatus 2. When the device does not require polling (No), the process proceeds to step S10. When the device requires polling (Yes), the server apparatus 3 requests the input device 22 of the terminal apparatus 2 to send input information data using the USB communication function (Step S3).

At step S4, in response to the request, the input device 22 sends the input information data, which includes data indicating whether or not any input operation has been performed and, if so, further includes data including a content of the input operation, to the server apparatus 3 through the terminal apparatus 2 which acts as a hub. The server 3 receives the input information data.

At step S5, the server apparatus 3 analyzes the input information data sent from the input device 22 so as to determine whether or not any input operation has been performed with the input device 22 associated with the authentication number N, and, if so, whether or not the input operation represents appropriate data to be reflected in the operation of the application program.

When the server apparatus 3 determines that the input information data represents appropriate data (Yes at step S5), the process proceeds to step S6. At step S6, the server apparatus 3 determines whether or not an application program is being executed in connection with the input device 22 associated with the authentication number N. When the server apparatus 3 determines that the input information data does not represent appropriate data (No at step S5), the process proceeds to step S10.

At step S6, when an application program is being executed (Yes), the process proceeds to step S7. When an application program is not being executed (No), the process proceeds to step S8.

At step S7, contents of the input information data are reflected in the application program.

At step S8, the server apparatus 3 determines whether or not a new application program is required to be activated based on the input information data. When a new application program is required to be activated (Yes), the process proceeds to step S9, and when a new application program is not required to be activated (No), the process proceeds to step S10.

At step S9, a new application program is activated in connection with the device which is associated with the authentication number N and the terminal apparatus 2.

Specific operations performed at steps S7 and S9 depend on the application program. Any image may be displayed on the display screen, or sound may be output from the sound generation device 231. How images are displayed on a screen and how data is transferred to the output device 23 will be described later.

At step S10, the server apparatus 3 determines whether or not the authentication number N of the devices 21–23 which are currently being accessed by the server apparatus 3 represents the last one of the authentication numbers allocated to the terminal apparatuses 2 included in the server system 1. When N is the last authentication number (Yes), the polling process ends. When N is not the last authentication number (No), the authentication number N is changed to a next number at step S11, and the process proceeds to step S2.

In the present embodiments, according to the operation procedure flow described above, an input operation performed with an input device 22 is reflected in the application program in the server apparatus 3.

Now, how images are displayed on a screen and how data is transferred to the output device 23 while an application program is being executed according to the present embodiment will be described below with respect to FIGS. 2 and 4.

As described above, a new application program is activated in connection with a terminal apparatus 2 and input and output devices 22 and 23 attached thereto. (This terminal apparatus is hereinafter referred to as "target terminal apparatus 2") The application program performs a USB communication with the target terminal apparatus 2 through the server apparatus 3 to allow an output device 23 of the target terminal apparatus 2 to perform a desired operation. Specifically, the desired operation includes generation of sound by a sound generation device 231 or lighting of an LED on a keyboard 221.

In order to display images on an image display device 21 connected to the target terminal apparatus 2, the one-way parallel terminal apparatus communication cable 41, the two-way serial terminal apparatus communication cable 42, the image display data signal line 211, and the image display device control signal bus 212 are used. Specifically, when the application program requests renewal of images displayed on the image display device 21 connected to the target terminal apparatus 2, the application program transfers an image display data packet 58 (FIG. 4) in synchronization with a packet enable signal 51 from the server apparatus 3 to the target terminal apparatus 2 through the one-way parallel terminal apparatus communication cable 41. The image display data packet 58 includes a code (authentication number) 53 for specifying a target terminal apparatus 2 connected through a data bus 52, a code 54 for indicating a coordinate at an upper left corner in a coordinate system of a rectangular region on the screen which is a part of image to be renewed, a code 55 for indicating a lower right corner in the coordinate system of the rectangular region which is a part of image to be renewed, a main part 56 of image data, a CRC (cyclic redundancy check) code 57 for error correction, etc. The controller IC 27 of the target terminal apparatus 2 analyzes the data packet 58 and confirms whether or not there is an error in the data packet 58 based on the code 57 for error correction. When there is no error, the controller IC 27 writes the image data in the frame memory 28 corresponding to authentication number 53, the code 54 for indicating a coordinate at the upper left corner in a coordinate system of a rectangular region on the screen which is a part of image to be renewed, the code 55 for indicating the lower right corner in the coordinate system of the rectangular region which is a part of image to be renewed and the main part 56 of the image data. When there is an error, the controller IC 27 stores a content of the error. After the transfer of the image display data packet 58 is completed, the server apparatus 3 uses the USB communication function of the two-way serial terminal apparatus communication cable 42 to request the controller IC 27 to report the error status at the time of transferring the image display data packet 58 to the target terminal apparatus 2. The controller IC 27 of the target terminal apparatus 2 sends the previously stored error content to the server apparatus 3. The server apparatus 3 resends a part of or all of the image display data based on the content of the error sent from the controller IC 27. The controller IC 27 has a refresh function for continuously transferring image data in the frame memory 28 to the image display device 21 using the image display data signal line 211 and the image display device control signal bus 212. Accordingly, when the image data in the frame memory 28 is refreshed, changes to the image data in the frame memory 28 are instantly reflected in the displayed image on the image display device.

As described hereinabove, according to the present embodiment, in the server system 1 including a single server apparatus 3 and a plurality of terminal apparatuses 2, an operating system which handles all tasks performed by the respective terminal apparatuses 2 is executed on the server apparatus 3. The server apparatus 3 generates image display data for the image display device 21 attached to the terminal apparatus 2 and an output control signal for the output device 23 attached to the terminal apparatus 2. The server apparatus 3 recognizes an input information signal from the input device 22 attached to the terminal apparatus 2, and the input information is reflected in the operating system and an application program executed on the server apparatus 3.

Therefore, according to the present embodiment, a greater number of terminal apparatuses 2 can be provided in a server system at a low cost compared to a conventional server system. In general, since the system includes a large number of terminal apparatuses for a single server apparatus, reduction in cost of a single terminal apparatus 2, leads to a large reduction in cost of the entire system in comparison with a case where the cost of the server apparatus 3 is reduced. Moreover, an investment for increasing the number of terminal apparatuses 2 after the system has started to operate can be kept low. With such a structure of the server system 1, the upgrade of the entire system can be achieved by upgrading only the single server apparatus 3. Consequently, a great number of functional devices provided in the terminal apparatuses 2 can also be reduced, whereby power consumption for the entire system can be kept low.

Moreover, according to the present embodiment, when an application program is commonly used by a plurality of terminal apparatuses 2 (for example, when a plurality of users take part in an interactive game over a network or when a television conference is held over a network), information can be shared in real time, and thus, the application program can be executed with high performance since information for all of the terminal apparatus 2 is present on the single server apparatus 3.

In the present embodiment, the server apparatus 3 includes image display data generation means for generating image display data provided for image display device 21 and output control data generation means for generating an output control signal provided for output device 23, but the present invention is not limited to this structure. The present invention only requires at least one of the image display data generation means and output control data generation means to be provided in the server apparatus 3.

According to an embodiment of the present invention, a server apparatus recognizes an input information signal from an input device attached to a terminal apparatus, and an operating system and application programs which handle all tasks performed by the respective terminal apparatuses can be executed on the server apparatus based on the input information signal. Therefore, the terminal apparatus according to an embodiment of the present invention can be structured at a lower cost compared to a conventional terminal apparatus. Moreover, since the system includes a large number of terminal apparatuses for a single server apparatus, reduction in cost of a single terminal apparatus leads to a large reduction in cost of the entire server system in comparison with a case where the cost of the server apparatus is reduced. The reduction in cost of a single terminal apparatus also allows an investment for increasing the number of terminal apparatuses after the system has started to operate to be kept low. The upgrade of the entire server system can be achieved by upgrading only the single server apparatus. Consequently, a great number of functional devices provided in terminal apparatuses can be reduced, whereby a great deal of power consumption for the entire server system can be reduced.

Moreover, when an application program is commonly used by a plurality of terminals (for example, when a plurality of users take part in an interactive game over a network or when a television conference is held over a network), information can be shared in real time, and thus the application program can be executed with high performance. This is because information for the respective terminal apparatuses is stored in the same single server apparatus.

According to an embodiment of the present invention, the server apparatus can generate image display data for an image display device attached to the terminal apparatus or an output control signal for an output device attached to the terminal apparatus based on an input information signal sent from an input device of the terminal apparatus. Therefore, the image display data which is provided in the image display device attached to the terminal apparatus or the output control signal for the output device attached to the terminal apparatus can be readily generated only using an operating system and an application program in the server apparatus.

According to an embodiment of the present invention, a plurality of terminal apparatuses are arranged in a tree configuration such that the terminal apparatuses are electrically connected to each other and the terminal apparatuses function as a hub for the input device and the output device provided for the terminal apparatus. Therefore, the number of transmission lines can be reduced and the transmission lines can be electrically connected to each other in a more effective manner.

According to an embodiment of the present invention, an operating system and application programs can be executed on the server apparatus in a parallel or serial time-sharing system for each one of a plurality of terminal apparatuses (image display devices), and input and output devices connected thereto.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A server system comprising a server apparatus and one or more terminal apparatuses electrically connected to the server apparatus through a transmission line, wherein:
the one or more terminal apparatuses each include one or more input devices; and
the server apparatus implements an operating system and an application program, the server apparatus including input information recognition means for recognizing an input information signal which is output from each of the one or more input devices and input to the server apparatus, the server apparatus executing the operating system and the application program based on the input information signal, and the server apparatus employing an image transfer means for transferring only image display data for a part of a display image which is to be updated only when the display image is replaced with a new display image.

2. A server system according to claim 1, wherein:
each of the one or more terminal apparatuses is connected to at least one of one or more image display devices and one or more output devices; and
the server apparatus includes at least one of image display data generation means, for generating image display data which is input to the one or more image display devices based on the input information signal, and output control data generation means, for generating an output control signal which is input to the one or more output devices based on the input information signal.

3. A server system according to claim 1, wherein the one or more terminal apparatuses and the server apparatus each include communication means which uses a same communication method to realize mutual communication between the at least one terminal apparatus and the server apparatus.

4. A server system according to claim 3, wherein:

the one or more terminal apparatuses are arranged in a tree configuration such that the terminal apparatuses are electrically connected to each other; and the one or more terminal apparatuses function as a hub for the input device and the output device included in the at least one terminal apparatus.

5. A server system according to claim 1, wherein:

the server apparatus recognizes the terminal apparatus in connection with all of the one or more input devices and/or the one or more output devices attached to the terminal apparatus; and the input information signal is reflected in the application program executed on the server apparatus.

6. A server system according to claim 5, wherein:

the one or more terminal apparatuses each have a first authentication number;

the input device and the output device each have a second authentication number; and the server apparatus recognizes the first authentication number and each of the second authentication numbers for all of the input devices and/or the output devices attached to the terminal apparatus in connection with each other, and executes the application program in association with the first and second authentication numbers.

7. A server apparatus implementing an operating system and an application program, wherein:

the server apparatus includes input information recognition means for recognizing an input information signal which is input to the server apparatus;

the server apparatus executes the operating system and the application program based on the input information signal; and the server apparatus employs an image transfer means for transferring only image display data for a part of a display image which is to be updated only when the display image is replaced with a new display image.

8. A server apparatus according to claim 7, wherein:

the server apparatus is connected to one or more terminal apparatuses, each of which is connected to at least one of one or more image display devices and one or more output devices; and the server apparatus includes at least one of image display data generation means, for generating image display data which is input to the one or more image display devices based on the input information signal, and output control data generation means, for generating an output control signal which is input to the one or more output devices based on the input information signal.

9. A server apparatus according to claim 7, wherein the one or more terminal apparatuses and the server apparatus each include communication means which uses a same communication method to realize mutual communication therebetween.

10. A server apparatus according to claim 7, wherein:

the server apparatus recognizes the terminal apparatus in connection with all of the one or more input devices and/or the one or more output devices attached to the terminal apparatus; and the input information signal is reflected in the application program executed on the server apparatus.

11. A server apparatus according to claim 10, wherein:

the one or more terminal apparatuses each have a first authentication number;

the input device and the output device each have a second authentication number; and the server apparatus recognizes the first authentication number of each terminal apparatus and the second authentication numbers for all of the input devices and/or the output devices attached to the terminal apparatus in connection with each other, and executes the application program in association with the first and second authentication numbers.

* * * * *